US008486472B2

(12) United States Patent
Koefod et al.

(10) Patent No.: US 8,486,472 B2
(45) Date of Patent: *Jul. 16, 2013

(54) ANTIMICROBIAL SALT SOLUTIONS FOR FOOD SAFETY APPLICATIONS

(75) Inventors: Robert Scott Koefod, Maple Grove, MN (US); Timothy Freier, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 1025 days.

This patent is subject to a terminal disclaimer.

(21) Appl. No.: 12/087,560

(22) PCT Filed: Jan. 18, 2007

(86) PCT No.: PCT/US2007/001320
§ 371 (c)(1),
(2), (4) Date: Jul. 9, 2008

(87) PCT Pub. No.: WO2007/084607
PCT Pub. Date: Jul. 26, 2007

(65) Prior Publication Data
US 2009/0011097 A1 Jan. 8, 2009

Related U.S. Application Data

(63) Continuation-in-part of application No. 11/335,167, filed on Jan. 18, 2006, now Pat. No. 7,658,959.

(51) Int. Cl.
*A23L 3/34* (2006.01)
(52) U.S. Cl.
USPC .............................. 426/321; 426/531; 426/532
(58) Field of Classification Search
USPC .......................................... 426/532, 531, 321
See application file for complete search history.

(56) References Cited

U.S. PATENT DOCUMENTS

| 2,154,449 | A | 4/1939 | Hoffman et al. |
|---|---|---|---|
| 2,854,477 | A | 9/1958 | Steinhauer |
| 3,216,932 | A | 11/1965 | Heiss et al. |
| 3,806,615 | A | 4/1974 | Frankenfeld et al. |
| 4,002,775 | A | 1/1977 | Kabara |
| 4,048,342 | A | 9/1977 | Haas et al. |
| 4,067,997 | A | 1/1978 | Kabara |
| 4,160,820 | A | 7/1979 | Wagenknecht et al. |
| 4,189,481 | A | 2/1980 | Kabara |
| 4,298,624 | A | 11/1981 | Mehring et al. |
| 4,299,852 | A | 11/1981 | Ueno et al. |
| 4,363,763 | A | 12/1982 | Peterson |
| 4,469,635 | A | 9/1984 | Peterson |
| 4,485,029 | A | 11/1984 | Kato et al. |
| 4,539,212 | A | 9/1985 | Hunter |
| 4,576,728 | A | 3/1986 | Stoddart |
| 4,722,941 | A | 2/1988 | Eckert et al. |
| 4,749,508 | A | 6/1988 | Cockrell, Jr. et al. |
| 4,749,561 | A | 6/1988 | Lane et al. |
| 4,820,449 | A | 4/1989 | Menke et al. |
| 4,839,086 | A | 6/1989 | Zaid |
| 4,908,147 | A | 3/1990 | Tsao et al. |
| 4,921,694 | A | 5/1990 | Hoppe et al. |
| 4,938,953 | A | 7/1990 | Pena et al. |
| 5,069,922 | A | 12/1991 | Brotsky et al. |
| 5,079,036 | A | 1/1992 | Roe et al. |
| 5,093,140 | A | 3/1992 | Watanabe |
| 5,143,739 | A | 9/1992 | Bender et al. |
| 5,166,177 | A | 11/1992 | Thomas et al. |
| 5,208,257 | A | 5/1993 | Kabara |
| 5,219,887 | A | 6/1993 | Andrews et al. |
| 5,283,073 | A | 2/1994 | Bender et al. |
| 5,284,833 | A | 2/1994 | McAnalley et al. |
| 5,364,650 | A | 11/1994 | Guthery |
| 5,378,731 | A | 1/1995 | Andrews et al. |
| 5,380,756 | A | 1/1995 | Andrews et al. |
| 5,460,802 | A | 10/1995 | Asami et al. |
| 5,460,833 | A | 10/1995 | Andrews et al. |
| 5,490,992 | A | 2/1996 | Andrews et al. |
| 5,520,575 | A | 5/1996 | Dickson |

(Continued)

FOREIGN PATENT DOCUMENTS

| CA | 2589507 | 6/2006 |
|---|---|---|
| EP | 243 145 | 10/1987 |

(Continued)

OTHER PUBLICATIONS

R.E Wolley, DVM, PhD.: EDTA-tris Potentiation of Antimicrobial Agents, Modern Veterinary Ptactice, pp. 113-116, Feb. 1983.
Rachel Schemmel, et al.: Monolaurin as an Anticaries Agent, Symposium on the Pharmacological Effect of Lipids, St. Louis, The American Oil Chemist's Society, Champaign, Illinois, p. 37 (Date not available).
Nobuyuki Katp et al.: Combined Effect of Citric and Polyphosphoric Acid on the Antibacterial Activity of Monoglycerides, pp. 2-9, Apr. 10, 1976.

(Continued)

*Primary Examiner* — Helen F Heggestad

(57) ABSTRACT

Antimicrobial formulations and solutions for food safety and quality applications are disclosed. Because some of these formulations and solutions contain a substantial concentration of salt, they are adaptable to a variety of food-processing applications, such as for chilling brine applications, disinfecting meat baths/rinses, beef injection brines, poultry chill tanks, brines used in cheese manufacture, as a wash to kill *salmonella* and other bacteria on hard-boiled eggs or egg shells, and as a wash to disinfect produce, which can become contaminated with *salmonella* and other pathogenic bacteria in the field. These uses of concentrated salt solutions that depress the freezing point of the solution provide a low temperature bath or shower in which food products can be cooled. One embodiment comprises between 25 ppm and 100,000 ppm surfactant and between 72% and 99.99% salt. This blend can then be dissolved in water to make a solution of between about 1% total solids by weight up to the saturation point, which can be used as an antimicrobial solution for food safety applications.

9 Claims, No Drawings

U.S. PATENT DOCUMENTS

| | | | |
|---|---|---|---|
| 5,569,461 A | 10/1996 | Andrews | |
| 5,585,028 A | 12/1996 | Berger | |
| 5,622,708 A | 4/1997 | Richter et al. | |
| 5,632,153 A | 5/1997 | Ricklefs et al. | |
| 5,756,107 A | 5/1998 | Hahn et al. | |
| 5,792,473 A | 8/1998 | Gergely et al. | |
| 5,851,974 A | 12/1998 | Sandhu | |
| 5,909,745 A | 6/1999 | Ali et al. | |
| 5,968,539 A | 10/1999 | Beerse et al. | |
| 5,980,375 A | 11/1999 | Anderson et al. | |
| 6,121,215 A | 9/2000 | Rau | |
| 6,183,757 B1 | 2/2001 | Beerse et al. | |
| 6,190,675 B1 | 2/2001 | Beerse et al. | |
| 6,194,370 B1 | 2/2001 | Williams, Jr. et al. | |
| 6,197,315 B1 | 3/2001 | Beerse et al. | |
| 6,197,738 B1 | 3/2001 | Regutti | |
| 6,214,363 B1 | 4/2001 | Beerse et al. | |
| 6,214,783 B1 | 4/2001 | Gambogi et al. | |
| 6,217,887 B1 | 4/2001 | Beerse et al. | |
| 6,231,843 B1 | 5/2001 | Hoelzel et al. | |
| 6,284,259 B1 | 9/2001 | Beerse et al. | |
| 6,287,577 B1 | 9/2001 | Beerse et al. | |
| 6,331,261 B1 | 12/2001 | Waatti et al. | |
| 6,376,438 B1 | 4/2002 | Rosenberger et al. | |
| 6,407,143 B1 | 6/2002 | Even et al. | |
| 6,432,885 B1 | 8/2002 | Vollmer | |
| 6,436,445 B1 | 8/2002 | Hei et al. | |
| 6,475,499 B2 | 11/2002 | Maubru et al. | |
| 6,867,233 B2 | 3/2005 | Roselle et al. | |
| 7,090,882 B2 | 8/2006 | Koefod et al. | |
| 7,588,696 B2 | 9/2009 | Koefod | |
| 7,658,959 B2 | 2/2010 | Koefod et al. | |
| 7,883,732 B2 | 2/2011 | Koefod et al. | |
| 2002/0004464 A1 | 1/2002 | Nelson et al. | |
| 2002/0098210 A1 | 7/2002 | Hahn et al. | |
| 2002/0182267 A1 | 12/2002 | Kleinberg et al. | |
| 2003/0176500 A1 | 9/2003 | Molly et al. | |
| 2003/0180377 A1 | 9/2003 | Ramirez et al. | |
| 2003/0185902 A1 | 10/2003 | Hei et al. | |
| 2004/0253352 A1 | 12/2004 | Koefod et al. | |
| 2005/0096245 A1 | 5/2005 | Hei et al. | |
| 2006/0110506 A1 | 5/2006 | Burwell et al. | |
| 2006/0157415 A1 | 7/2006 | Koefod et al. | |
| 2007/0087093 A1 | 4/2007 | Koefod | |

FOREIGN PATENT DOCUMENTS

| | | |
|---|---|---|
| EP | 244 144 | 11/1987 |
| EP | 312 519 | 4/1989 |
| EP | 368 622 | 5/1990 |
| EP | 0423923 | 7/1990 |
| EP | 530 861 | 3/1993 |
| EP | 633 767 | 1/1995 |
| EP | 670 160 | 9/1995 |
| EP | 713 096 | 5/1996 |
| EP | 874 988 | 11/1998 |
| EP | 891 711 | 1/1999 |
| WO | 88/00463 | 1/1988 |
| WO | 92/21320 | 12/1992 |
| WO | 93/00100 | 1/1993 |
| WO | 93/19154 | 9/1993 |
| WO | 93/19159 | 9/1993 |
| WO | 94/09106 | 4/1994 |
| WO | 95/07616 | 3/1995 |
| WO | 95/32705 | 12/1995 |
| WO | 96/19181 | 6/1996 |
| WO | 97/22878 | 6/1997 |
| WO | 98/09520 | 3/1998 |
| WO | 98/55093 | 12/1998 |
| WO | 98/55095 | 12/1998 |
| WO | 99/20729 | 4/1999 |
| WO | 99/36494 | 7/1999 |
| WO | 99/66020 | 12/1999 |
| WO | 00/01238 | 1/2000 |
| WO | 00/22082 | 4/2000 |
| WO | 00/30460 | 6/2000 |
| WO | 00/61105 | 10/2000 |
| WO | 00/71183 | 11/2000 |
| WO | 01/16267 | 3/2001 |
| WO | 01/41927 | 6/2001 |
| WO | 01/43549 | 6/2001 |
| WO | 01/55287 | 8/2001 |
| WO | 02/15809 | 2/2002 |
| WO | 02/24845 | 3/2002 |
| WO | 02/50223 | 6/2002 |
| WO | 2005/000029 | 1/2005 |
| WO | 2006/066253 | 6/2006 |
| WO | 2007/084607 | 7/2007 |
| WO | 2007/139722 | 12/2007 |

OTHER PUBLICATIONS

Nobuyuki Kato, et al.: Combined Effect of Different Drugs on the Antibacterial Activity of Fatty Acids and Their Esters, pp. 1-7, Sep. 25, 1975.

International Search Report for PCT/US05/46150, dated Sep. 5, 2006, 1 pg.

International Search Report fro PCT/US07/01320, dated Dec. 5, 2007, 2 pgs.

International Search Report for PCT/US07/11910, dated Oct. 24, 2007, 1 pg.

International Search Report for PCT/US04/18862, dated Jun. 20, 2005, 1 pg.

The site "diphenyl oxide" at http://www.thegoodscentscompany.com/data/rw1004531.htmp, downloaded Nov. 23, 2008.

Canadian Intellectual Property Office, Office Action for CA 2589517, Jul. 13, 2011 citing the European reference cited above (EP0423923).

ANTIMICROBIAL SALT SOLUTIONS FOR FOOD SAFETY APPLICATIONS

CROSS-REFERENCE TO RELATED APPLICATIONS

This application claims priority to U.S. application Ser. No. 11/335,167, filed 18 Jan. 2006, now U.S. Pat. No. 7,658,989, and entitled ANTIMICROBIAL SALT SOLUTIONS FOR FOOD SAFETY APPLICATIONS, which is a continuation-in-part of U.S. application Ser. No. 10/460,769, filed 12 Jun. 2003, now U.S. Pat. No. 7,090,882, naming the same inventors as the present application, and entitled ANTIMICROBIAL SALT SOLUTIONS FOR FOOD-SAFETY APPLICATIONS and U.S. application Ser. No. 11/303,260, filed 15 Dec. 2005, now U.S. Pat. No. 7,588, 696, and entitled ANTIMICROBIAL WATER SOFTENER AND SOLUTIONS, which claims the benefit of U.S. Provisional Application No. 60/636,337, filed 15 Dec. 2004, and entitled ANTIMICROBIAL WATER SOFTENER SALT AND SOLUTIONS and U.S. Provisional Application No. 60/637,674, filed 16 Dec. 2004, and entitled ANTIMICROBIAL WATER SOFTENER SALT AND SOLUTIONS. The entirety of each of these applications is incorporated herein by reference.

FIELD OF THE INVENTION

This invention relates to antimicrobial solutions for food safety and quality applications.

BACKGROUND OF THE INVENTION

The prevention of contamination of food product by pathogenic microorganisms is important to protect public health. The reduction of spoilage microorganisms in food manufacturing facilities can extend product shelf lives and reduce the amount of food that is discarded as waste. There is a need for improved methods of controlling microorganisms in food production plants. Microorganisms can accumulate at a variety of different points in a food manufacturing operation; the more points at which viable microorganisms can be controlled, the lower the chances of food contamination and the safer the manufacturing process.

The use of acid-anionic surfactants as antibacterial agents is known. These agents have limited utility in environments where operation at low temperature is required, as their effectiveness drops off significantly at lower temperature and, of course, operation below 0° C. is typically prevented by freezing. Their activity is also directly dependent on maintaining a relatively low pH, with activities dropping rapidly above pH 3.

Other antibacterial agents have been identified, but their use is problematic due to their non-food quality status. For example, a wide variety of chemical disinfecting agents are in use in food plants. However, there are often disadvantages to these chemicals. In some instances they are too toxic to come into direct contact with the food itself, and may present worker safety or environmental waste disposal issues. In other instances they are insufficiently effective to provide adequate kill of microorganisms, especially at low temperatures. Additionally, the relatively high cost of these chemicals adds to the cost of food production and, consequently, increases the cost of the end product itself.

Salt has been used for thousands of years as a food preservative. Often, however, salt solutions alone are not sufficiently effective as antibacterial agents, as they do not provide a speedy mechanism for killing unwanted bacteria that permits their exclusive use in food processing environments. Also there are certain pathogenic microorganisms that survive very well in salt brines even at cold temperatures, such as *Listeria monocytogenes*.

Thus, a problem associated with the antimicrobial solutions for food safety applications that precede the present invention is that they do not provide an improved antimicrobial solution for food safety applications having operating parameters adaptable to a multiplicity of applications in the food processing industry.

Another problem associated with the antimicrobial solutions for food safety applications that precede the present invention is that they do not provide an antimicrobial solution for food safety applications having safe, acceptable ingredients for use in food processing to prevent bacteria from accumulating in food processing operations.

Yet another problem associated with the antimicrobial solutions for food safety applications that precede the present invention is that they do not provide an antimicrobial solution for food safety applications that can be used at temperatures below room temperature, and preferably below the normal freezing point of water (0° C.).

Still a further problem associated with the antimicrobial solutions for food safety applications that precede the present invention is that they may contain or lead to toxic and/or environmentally undesirable additives. For example, they may contain quaternary ammonium chloride as the anti-bacterial ingredient, or they may form chlorinated or brominated byproducts, or they may contain phosphates.

Yet another problem associated with the antimicrobial solutions for food safety applications that precede the present invention is that they do not provide an antimicrobial solution for food safety applications that is relatively inexpensive to purchase, use and maintain.

Yet another problem associated with some of the antimicrobial solutions for food safety applications that precede this invention is that they require low pH for effectiveness, and low pH solutions have detrimental effects on concrete floors and can contribute to corrosion of equipment. There is a need for antimicrobial solutions which are highly effective at neutral or near neutral pH.

For the foregoing reasons, there has been defined a long felt and unsolved need for an improved antimicrobial solution for food safety applications.

SUMMARY OF THE INVENTION

An embodiment of the invention described herein is a food-safe solution or composition for use in solution that may be used in a variety of applications to control microorganisms in food plant operations, including the disinfection of food processing brines. The solution or composition of said embodiment may comprise surfactant and salt. The salt can be selected from inorganic salts such as the sodium, potassium, magnesium, calcium, iron, and ammonium salts of chloride, sulfate, nitrate, phosphate, carbonate and hydroxide or organic salts such as the sodium, potassium, magnesium, calcium and ammonium salts of formate, acetate, gluconate, propionate, and hydroxypropionate. Suitable surfactants may include sodium lauryl sulfate, linear alkylbenzene sulfonates, alcohol sulfates, alkyl sulfates, alkyl sulfonates, sodium alkyl methyltaurines, alpha-olefin sulfonates, alcohol ethoxylates, nonylphenyl ethoxylates, alkylpolyglucosides, fatty alcohols, fatty acids and fatty acid salts, lignosulfonates and lignin derivatives, hydroxypoly(oxyethylene) derivatives, fatty alkanolamides, fatty amine oxides, sodium dioctylsulfosuccinate, dodecylbenzene sulfonic acid and salts thereof, the sodium salt of sulfonated oleic acid, sodium dodecylbenzene sulfonate, lauramine oxide, dodecyldiphenyloxide-disulfonic acid and salts thereof.

These and other aspects of the present invention are elucidated further in the detailed description.

DETAILED DESCRIPTION OF PREFERRED EMBODIMENTS

The following description of the invention is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein.

It has been discovered that salts act synergistically with surfactant ingredients to provide a significant and unexpected increase in antibacterial effectiveness in solution.

In one embodiment of the present invention, a formulation for food safety applications is provided comprising surfactant and salt, and solutions comprising said formulation. In another embodiment of the present invention, a formulation for food safety applications is provided comprising acid, surfactant and salt, and solutions comprising said formulation.

Many applications for these and other embodiments according to the present invention are envisioned. One application is for disinfecting a food processing bath or rinse. For example, a solution of an antimicrobial composition according to the present invention could be used in or as a chill brine to minimize the bacterial contamination of the chill brine.

Further, bacterial contamination during slaughter is typically highest at the surface of the meat, and these solutions may be used as a method to kill bacteria directly on the meat surface in a manner that is food safe and will impart no toxic chemicals to the meat. A solution of the antimicrobial composition could be sprayed or showered on to animal carcasses or the carcasses could be directly immersed in a bath of the solution. The brine could be pre-chilled to provide a simultaneous cooling and disinfection. The antimicrobial brine can also be used to wash animals prior to slaughter, to minimize contamination from the animals' hides, skins or feathers. It can also be used as a disinfection wash/chill step for beef trim and other further processed meat and poultry parts.

Another application for some embodiments of the present invention is for beef injection brines. Brines are injected into enhanced beef products, and there is concern that the brine may drive bacteria, such as *E. coli* O157:H7, from the surface into internal areas of the meat. Cooking intact cuts of beef to rare or medium rare doneness could then lead to food-borne illness. Another concern is that the brine, which is recycled in the process, will become contaminated. Under the current regulatory environment, it is crucial that beef processors are able to prove lot-to-lot separation. Use of a validated antimicrobial in the injected brine solution could prevent the brine injection system from tying together multiple production lots. Other potential uses in the meat industry include hide curing, offal chilling and natural casing preservation.

In the poultry industry, contamination of the carcasses by *Salmonella* spp. and *Campylobacter* spp. is a major public health concern. Some embodiments according to the present invention could be used in poultry chill tanks to reduce this contamination and provide an energy-efficient cooling step, thus improving product shelf life and quality.

Brines used in cheese manufacture present another application for embodiments of the present invention. Cheese manufacture often involves a prolonged soak in concentrated brine. This step can introduce a significant risk for *L. monocytogenes* contamination. This risk could be minimized through the use of an antimicrobial salt solution in the brine.

Yet another application is as a wash to kill *salmonella* on eggs. Also, hard-boiled eggs are often pre-disinfected and shipped in brine. Use of some embodiments of the present invention would permit the disinfection step to be carried out in the storage brine itself. Yet another application is a wash to disinfect produce, which can become contaminated with *salmonella* and other pathogenic bacteria in the field.

Further it has been found that the salt/surfactant combination maintains antilisterial activity even in the presence of organic material. As the brine is recirculated in the meat processing facility, organic material (meat juice from leaking packages, meat from broken packages, debris rinsed from the outside of packages, etc.) can inhibit other antimicrobials such as chlorine. The salt/surfactant system maintained good activity despite the presence of this organic material.

The following examples further illustrate the synergistic and unexpected results from combining surfactant with salt.

Tests have identified a variety of surfactants which are extremely effective at killing *L. monocytogenes* in salt brines at neutral or near-neutral pH. These surfactants showed an unexpected and dramatic synergistic effect when used in combination with a salt. Tests were generally run according to the following procedure:

1. Inoculate a separate tube containing approximately 10 ml of Brain Heart Infusion (BHI) broth with the following *L. monocytogenes* strains: H2446 (CDC Global Standard), Scott A (serotype 4b), 12243 (serotype 1/2a), and two strains isolated from the environment of a cooked meat and poultry facility, designated WP1, and WP4. Incubate the tubes at least 5 days at 7-10° C.+/−20° C.

2. Assume the growth to be $10^9$ cfu/ml. Serially dilute each culture in cold (~7° C.). Butterfield's Phosphate Buffered Water (PBW) to $10^8$ cfu/ml (1:10). Since five cultures of *L. monocytogenes* are being used as a cocktail, begin the dilution series using 2.20 ml of each culture added to 99 ml of PBW.

3. Plate (-6, -7, -8) the diluted culture to get the starting count of the inoculum on Modified Oxford medium (MOX) using a thin agar overlay (TAL) technique (overlay with Trypticase Soy Agar [TSA]) to revive injured cells.

4. Add 1 ml of the diluted cocktail to 100 ml of cold test solution.

5. Mix the solutions well.

6. Determine the *L. monocytogenes* population at time 0 and 4 hours. Plate-1 (0.1 ml on 1 plate), -2, -3, and 4 dilutions using spread plates on MOX TAL with TSA.

7. Incubate the test solutions at test temperature for the duration of the experiment.

8. Incubate the MOX TAL with TSA plates at 20° C.+/−2° C. for 72+/−3 hours. Count representative colonies, which are black, and multiply by the dilution factor.

Table 1 provides a summary of results of these tests on several different surfactants in solution either alone or in combination with 20% sodium chloride, wherein the solutions were incubated at 2° C. (+/−1° C.):

TABLE 1

L. monocytogenes (cfu/mL) after 4 Hours in Solutions at 2° C.

| Solution Composition | L. mono count (cfu/mL) |
|---|---|
| Water (control) | $7.1 \times 10^4$ |
| 20% NaCl (control) | $1.0 \times 10^5$ |
| 50 ppm sulfonated oleic acid, Na salt | $1.3 \times 10^5$ |
| 50 ppm sulfonated oleic acid, Na salt + 20% NaCl | $7.7 \times 10^3$ |
| 50 ppm lauramine oxide | $3.6 \times 10^3$ |
| 50 ppm lauramine oxide + 20% NaCl | <10 |
| 50 ppm fatty alkanolamide | $1.1 \times 10^4$ |
| 50 ppm fatty akanolamide + 20% NaCl | <10 |
| 50 ppm nonylphenol ethoxylate | $1.3 \times 10^5$ |
| 50 ppm nonylphenol ethoxylate + 20% NaCl | 40 |
| 50 ppm sodium linear alkylbenzene sulfonate | $5.9 \times 10^3$ |
| 50 ppm sodium linear alkylbenzene sulfonate + 20% NaCl | <10 |
| 50 ppm alkyl polyglucoside | $9.6 \times 10^4$ |
| 50 ppm alkyl polyglucoside + 20% NaCl | 10 |

As shown in Table 1, there is an unexpected and dramatic synergistic effect between sodium chloride and the surfactants in killing L. monocytogenes. It can be seen that L. monocytogenes survived in very high concentration in 20.0% NaCl. A solution comprising 50 ppm surfactant alone resulted in only a 0 to 1.3 log reduction in L. monocytogenes compared to plain water. However, when the surfactants were combined with 20.0% NaCl brine, the kill of L. monocytogenes rose to a >4 log reduction compared to the solution with only 20.0% NaCl and no surfactant.

Table 2 shows data from another experiment which was carried out to determine the effect of different salts and different salt concentrations in combination with surfactants on L. monocytogenes survival in brines.

TABLE 2

L. monocytogenes (cfu/mL) after 4 Hours in Solutions at 2° C.

| Solution Composition | L. mono count (cfu/mL) |
|---|---|
| Water (control) | $5.45 \times 10^5$ |
| 20% NaCl (control) | $4.0 \times 10^5$ |
| 20% Potassium Acetate | $4.2 \times 10^5$ |
| 20% Sodium Acetate | $3.0 \times 10^4$ |
| 20% Sodium Formate | $3.6 \times 10^5$ |
| 50 ppm lauramine oxide | $5.8 \times 10^4$ |
| 50 ppm lauramine oxide + 20% NaCl | <10 |
| 50 ppm lauramine oxide + 10% NaCl | <10 |
| 50 ppm lauramine oxide + 5% NaCl | <10 |
| 50 ppm lauramine oxide + 1% NaCl | $2.1 \times 10^4$ |
| 50 ppm lauramine oxide + 20% Potassium Acetate | <10 |
| 50 ppm lauramine oxide + 20% Sodium Acetate | <10 |
| 50 ppm lauramine oxide + 20% Sodium Formate | <10 |
| 50 ppm lauramine oxide + 20% $MgSO_4$ | <10 |
| 50 ppm lauramine oxide + 10% $MgSO_4$ | <10 |
| 50 ppm lauramine oxide + 5% $MgSO_4$ | <10 |
| 50 ppm lauramine oxide + 1% $MgSO_4$ | $1.5 \times 10^4$ |
| 50 ppm $C_{12}$(branched) sodium diphenyl oxide disulfonate | $3.1 \times 10^4$ |
| 50 ppm $C_{12}$(branched) sodium diphenyl oxide disulfonate + 20% NaCl | <10 |
| 50 ppm alcohol ethoxylate | $1.9 \times 10^5$ |
| 50 ppm alcohol ethoxylate + 20% NaCl | <10 |
| 50 ppm sodium olefin sulfonate | $1.8 \times 10^5$ |
| 50 ppm sodium olefin sulfonate + 20% NaCl | <10 |

Data in Table 2 again shows that while the surfactant alone or sodium chloride alone has little effect on the survival of L. monocytogenes in solution, the combination of even low concentrations of surfactant with sodium chloride in solution has a powerful cidal effect on L. mono, giving over 4 log kill or higher. The data run on a particular surfactant, in this case a lauramine oxide, shows that it can be "activated" to be highly cidal towards L. monocytogenes over a broad range of sodium chloride concentrations. In solutions containing 5% and 20% NaCl, 50 ppm of the surfactant was highly cidal towards *L. monocytogenes*. The data in Table 2 also shows that salts other than sodium chloride are effective. A variety of organic salts, including formates and acetates, as well as magnesium sulfate all showed the same ability to "activate" low concentrations of surfactant to kill *L. monocytogenes* in solution, even though the salts by themselves had little effect on the organisms.

Because some embodiments of the present invention contain a substantial concentration of salt, these embodiments are ideal for a variety of applications. For instance, they are ideal for chilling brine applications. Chilling brines make use of concentrated salt solutions that depress the freezing point of the solution to provide a low temperature bath or shower in which food products can be efficiently cooled. Bacterial contamination of the chill brine is a food safety hazard, requiring that the brine be frequently disposed and often requiring rigorous cleaning of the equipment to remove bacterial biofilms. Contamination by *L. monocytogenes* is of particular concern in many ready-to-eat meat, poultry, seafood and dairy processing chill brine applications because it is known to survive in high salt concentrations and because many of the currently available disinfectant chemicals are either not suitable for direct food contact or become ineffective at the cold temperatures of the chill bath. Brine chillers are used extensively to cool frankfurters and other sausage products in continuous-cook operations. Dozens of nationwide recalls and at least one large food-borne outbreak have been caused by *L. monocytogenes* contamination of these types of products.

One useful application for these formulas is in chill brines used in the manufacture of cooked sandwich meats, sausages, and links. U.S. patent application Ser. No. 10/460,769, filed Jun. 12, 2003, describes embodiments consisting of a surfactant and an acid together which worked synergistically with the salt in food production chill brines to kill *L. monocytogenes*. One drawback of these embodiments was their acidity, which could have detrimental effects on concrete floors and steel equipment. The present embodiment provides certain types of surfactants which are very effective when combined with either inorganic or organic salts in solution at killing *L. monocytogenes* even in the absence of an acidifying agent.

Several tests were carried out to determine the effectiveness of embodiments according to the invention in meat processing chill brines. In one experiment, brine was taken at the end of a production week from a brine chiller used in a ready to eat, cooked beef production line. The sodium chloride concentration in this brine was approximately 17%. Samples of the brine with and without added surfactant were inoculated with a cocktail of *L. monocytogenes* as per the procedure described above, incubated at 4° C. for four hours, and then plated to determine *L. monocytogenes* survival. Results are summarized in Table 3.

TABLE 3

*L. monocytogenes* (cfu/mL) after 4 Hours in Beef Plant Brine at 4° C.

| Brine Composition | *L. mono* count (cfu/mL) |
|---|---|
| Brine Control (no additive) | $1.4 \times 10^6$ |
| 50 ppm lauramine oxide | <10 |
| 25 ppm lauramine oxide | <10 |
| 12.5 ppm lauramine oxide | <10 |
| 50 ppm sodium linear alkylbenzene | <10 |
| 25 ppm sodium linear alkylbenzene | <10 |
| 12.5 ppm sodium linear alkylbenzene sulfonate | <10 |
| 50 ppm nonylphenol ethoxylate | <10 |
| 25 ppm nonylphenol ethoxylate | <10 |
| 12.5 ppm nonylphenol ethoxylate | 20 |
| 50 ppm fatty alkanolaminde | <10 |
| 25 ppm fatty alkanolaminde | <10 |
| 12.5 ppm fatty alkanolaminde | 40 |
| 50 ppm sodium olefin sulfonate | 10 |
| 25 ppm sodium olefin sulfonate | 60 |
| 12.5 ppm sodium olefin sulfonate | 110 |

The data in Table 3 indicate that the brine taken from the meat processing plant very easily supported the survival of *L. monocytogenes*, raising the possibility of a food safety hazard should contamination of the brine ever occur. However, addition of even small concentrations of a single surfactant provided >5 log kill of *L. monocytogenes* in the brine. The surfactants are effective at remarkably low concentration when in combination with salt in solution. As little as 12.5 ppm of several of the surfactants in Table 3 killed essentially all of the inoculum. This experiment was also significant because it indicates that the salt/surfactant combination maintains antilisterial activity even in the presence of organic material. As the brine is recirculated in the meat processing facility, organic material (meat juice from leaking packages, meat from broken packages, debris rinsed from the outside of packages, etc.) can inhibit other antimicrobials such as chlorine. The salt/surfactant system maintained good activity despite the presence of this organic material.

Often the effectiveness of antimicrobial additives decreases at lower temperatures. Another test was run to determine the effectiveness of these formulas in an even colder meat processing brine. Five samples of spent chill brine were obtained at different times from a hot dog manufacturing plant, which uses a nearly saturated sodium chloride brine at a temperature of approximately −20° C. The brine samples were tested with and without addition of 50 ppm of an alcohol ethoxylate surfactant in the same manner as described above, except they were incubated for 4 hours at −20° C. before plating. Results are shown in Table 4.

TABLE 4

*L. monocytogenes* (cfu/mL) after 4 Hours in Hot Dog Plant Chill Brine at −20° C.

| Brine Sampling Date | Brine Control | Brine + 50 ppm Alcohol Ethoxylate |
|---|---|---|
| Jul. 7, 2005 | $1.5 \times 10^5$ | <10 |
| Jul. 14, 2005A | $5.3 \times 10^5$ | <10 |
| Jul. 14, 2005B | $2.8 \times 10^5$ | <10 |
| Mar. 18, 2005 | $5.7 \times 10^5$ | <10 |
| Jun. 10, 2005 | $4.9 \times 10^5$ | <10 |
| Apr. 19, 2005 | $6.5 \times 10^5$ | <10 |

The data in Table 4 indicate that the process brines supported the survival of *L. monocytogenes* very well even at −20° C. However, addition of 50 ppm of alcohol ethoxylate resulted in kill of essentially the entire ~5 log inoculum within 4 hours. Tests were subsequently run on even lower concentrations of the alcohol ethoxylate surfactant in the brine. Concentrations of 12.5 ppm were as effective as 50 ppm.

In addition to being effective against organisms in an aqueous solution, tests indicated that some embodiments of the invention were also effective against organisms in a biofilm. Biofilms can provide a haven for pathogens, increasing their resistance to antimicrobial treatments, and thereby providing another possible source of food contamination. Tests were run to see if some embodiments were effective against a *L. monocytogenes* biofilm. Challenge tests were run according to the procedure below. Test solutions were prepared from a sample of hot dog plant chill brine which was treated with various levels of the alcohol ethoxylate surfactant. Cooked turkey was added to the test solution before inoculation to simulate a worst case "dirty" brine with a high degree of organic load.

1. Inoculate five cultures, *L. monocytogenes* H2446 (CDC Global Standard), Scott A-serotype 4b, 12243-serotype 1/2a, WP1 and WP4 in 10 ml Brain Heart Infusion broth (BHI). Incubate the tubes for 7 days at 10° C.+/−2° C.
2. Aseptically dispense 50 ml of sterile Tryptic Soy Broth (TSB)+0.6% Yeast Extract (YE) into sterile disposable 50 ml conical shaped plastic tubes. Make enough tubes for each time point.
3. Aseptically drop one coupon into the broth in each tube.
4. Make a cocktail of the five cultures and add 0.1 ml into each tube. Incubate the tubes for 7 days at 7° C.+/−2° C.
5. Dispense 40 ml of antimicrobial salt solutions containing sterile phosphate buffer into 50 ml plastic tubes.
6. After biofilm has grown, aseptically remove coupon and rinse each side for 5 seconds with sterile distilled water to remove unattached cells.
7. Aseptically drop each rinsed coupon into the antimicrobial salt solution tube and incubate for appropriate time (1 hour and 24 hour) at −20° C.+/−2° C.
8. Aseptically add 45 ml of sterile phosphate buffer (PBW) to 50 ml conical shaped plastic tubes along with 10 sterile glass beads.
9. After incubate time is complete, aseptically move the coupon from the antimicrobial salt solution to the sterile (PBW) solution containing beads.
10. Shake the tube with glass beads for about 2 minutes to remove attached cells.
11. Plate the cells in the PBW solution on TSA+0.6% YE using appropriate dilutions and incubate at 20° C. for 72+/−2 hours.
12. Plate the antimicrobial salt solution on TSA+0.6% YE using appropriate *dilutions and incubate 20° C. for 72+/−2 hours. *Please make note: The first dilution should take place in 9 ml DE Neutralizing Buffer. After incubation, count typical colonies and record results to cfu/g. Results of this challenge study are given in Table 5.

TABLE 5

*L. mono* Biofilm Challenge in Hot Dog Plant Chill Brine at −20° C.

| Surfactant Concentration | 1 hour (cfu/coupon) | 24 hours (cfu/coupon) |
|---|---|---|
| Control (0 ppm) | 44,000 | 9700 |
| 15 ppm alcohol ethoxylate | 5,000 | 5600 |

TABLE 5-continued

L. mono Biofilm Challenge in Hot Dog Plant Chill Brine at −20° C.

| Surfactant Concentration | 1 hour (cfu/coupon) | 24 hours (cfu/coupon) |
|---|---|---|
| 25 ppm alcohol ethoxylate | 3500 | 250 |
| 50 ppm alcohol ethoxylate | 10-100 | <10 |

As shown in Table 5, it appears that even at the near neutral pH of the plant chill brine, low concentrations of surfactant are effective at killing *L. monocytogenes* in a biofilm. In this experiment, higher concentrations of surfactant were required to achieve 4 log kill than was seen in the solution challenge studies. This may be due to the greater resistance of the biofilm, but it also may be due to the brine being made very "dirty" with high organic loading in this experiment. Even with very "dirty" brine, 50 ppm alcohol ethoxylate showed >2 log kill of the biofilm within 1 hour and showed >3 log kill after 24 hours.

Tests were run to determine the effectiveness of formulas against organisms other than *L. monocytogenes*. Uncharacterized microorganisms were cultured from a sample of raw ground beef and used to challenge 24% sodium chloride brines with and without different surfactants. The test solutions were inoculated with the ground beef organism culture and incubated for 4 hours at −5° C. before plating. Results are given in Table 6.

TABLE 6

Total Plate Count (cfu/mL) after 4 Hours in 24% NaCl Brine at −5° C.

| Brine Composition | Total plate count (cfu/mL) |
|---|---|
| Brine Control (no additive) | $6.3 \times 10^5$ |
| 800 ppm nonylphenolethoxylate | 40 |
| 800 ppm sodium salt of sulfonated oleic acid | $5.2 \times 10^3$ |
| 800 ppm alcohol ethoxylate | <10 |
| 800 ppm Toximul 3479F | <10 |
| 800 ppm sodium linear alkylbenzene sulfonate | <10 |
| 800 ppm $C_{12}$(branched) sodium diphenyl oxide disulfonate + 20% NaCl | $1.0 \times 10^3$ |
| 800 ppm Toximul TA-5 | 20 |
| 800 ppm Toximul 8382 | $7.8 \times 10^3$ |
| 800 ppm decyl alcohol ethoxylate, POE-6 | 10 |
| 800 ppm Toximul 3409F | 160 |
| 800 ppm Toximul 3455F | 60 |

Data in Table 6 indicates that a number of surfactants in combination with brine are also effective in killing the total plate count organisms found in raw ground beef.

In another embodiment of the present invention, an unexpected synergistic effect has also been found between acid, sodium chloride and sodium lauryl sulfate (SLS) antibacterial additive. Replicate tests were run to determine if this effect was statistically significant. Ten percent by weight solutions were prepared of a formula of 0.6% citric or malic acid, 100 ppm SLS, and 99.4% sodium chloride. Solutions were also prepared containing an identical concentration of acid and SLS but no sodium chloride. A bacterial culture suspension (*Escherichia coli* ATCC 11229) that had been incubated for 24 hours in Brain Heart Infusion (BHI) broth and had an initial inoculum count of about $10^9$ CFU/ml was serially diluted in cold Butterfield's Phosphate Buffered Water (BPBW) to $10^5$ CFU/ml. A 1.0 ml aliquot of this suspension was added to 100 ml of test solution at room temperature and mixed well, providing an initial inoculum of $10^3$ CFU/ml. After 30 minutes, the *E. coli* populations were enumerated by plating on tryptic soy agar (TSA), making serial dilutions as necessary in BPBW. Plates were incubated at 35° C.+/−2° C. for approximately 24 hours. Colonies were then counted and compared to the initial inoculum counts. Results of these tests run on 16 replicates of each test solution are given in Table 7.

TABLE 7

Effectiveness of Acid/SLS Solutions with and without Salt on *E. coli*

| Test Solution | Average Concentration of *E. Coli* (CFU/ml) |
|---|---|
| citric acid, SLS, with salt | 540 |
| citric acid, SLS, without salt | 1054 |
| malic acid, SLS, with salt | 141 |
| malic acid, SLS, without salt | 2419 |

Referring to Table 7, it can be seen that for both the citric acid/SLS and malic acid/SLS additives, the number of bacteria remaining alive after 30 minutes is much lower when salt is present than when there is no salt present. Analysis of the data indicates that there is a statistically significant increase in kill in the presence of salt (p<0.05). In contrast, a 10% solution of pure sodium chloride does not provide any significant kill of the test microorganisms.

To study chilling brine application of the current embodiment, tests were run on 17% by weight solutions of formulas consisting of between 0.3% and 6.0% citric acid, between 50 and 500 ppm SLS, and between 94% and 99.7% sodium chloride. Test solutions were cooled to −7° C. and inoculated with several strains of *L. monocytogenes*. Within 4 hours most solutions showed a 3 log kill of microorganisms and within 24 hours nearly all solutions showed no measurable plate count of the inoculum. A brine solution made up of sodium chloride alone caused less than a 1 log reduction of the *L. monocytogenes* over a 24-hour period.

An experiment was run to determine if solutions containing sodium chloride, sodium lauryl sulfate, and various acids would kill *L. monocytogenes* at cold temperatures. The following test procedure was used: A bacterial culture suspension (*L. monocytogenes* H2446 [CDC Global Standard]; Scott A-serotype 4b; 12243-serotype 1/2a; and a recent cooked meat and poultry facility isolate, WP4) that had been incubated for at least 5 days in BHI broth and had an initial inoculum count of about $10^9$ CFU/ml was serially diluted in cold BPBW to $10^5$ CFU/ml. A 1.0 ml aliquot of this suspension was added to 100 ml of cold (−7° C.+2° C.) test solution and mixed well, providing an initial inoculum of $10^3$ CFU/ml. The test solutions were incubated at −7° C.+/−2° C. for the duration of the experiment. At intervals of 0, 4, and 24 hours the *L. monocytogenes* populations in the test solutions were determined on Modified Oxford agar (MOX). MOX plates were incubated at 35° C.+/−2° C. for approximately 48 hours. Colonies were then counted and compared to the initial inoculum counts.

Results are given in Table 8. Each test solution was a 17% by weight solution of the listed formula prepared in soft water.

TABLE 8

Effect of Solutions of NaCl, SLS and various acids on *L. monocytogenes*

| Sample | Time 0 CFU/ml | 4 hr CFU/ml | 24 hr CFU/ml | pH | Water Activity |
|---|---|---|---|---|---|
| 100% NaCl | 1550 | 1250 | 1170 | 7.88 | 0.88 |
| 2.0% Malic Acid 500 ppm SLS 98.0% NaCl | 0 | 0 | 0 | 1.21 | ND |
| Water Control | 1270 | 400 | 0 | 9.34 | 0.999 |
| 0.3% Malic Acid 100 ppm SLS, 99.7% NaCl | 480 | 5 | 0 | 4.1 | ND |
| 0.5% Malic Acid, 100 ppm SLS, 99.5% NaCl | 176 | 0 | 0 | 3.31 | ND |
| 0.7% Malic Acid, 100 ppm SLS, 99.3% NaCl | 117 | 0 | 0 | 2.99 | 0.88 |
| 0.3% Citric Acid, 500 ppm SLS, 99.7% NaCl | 5 | 0 | 0 | 4.14 | ND |
| 0.5% Citric Acid, 500 ppm SLS, 99.5% NaCl | 0 | 0 | 0 | 3.37 | ND |
| 0.7% Citric Acid, 500 ppm SLS, 99.3% NaCl | 0 | 0 | 0 | 2.98 | 0.88 |
| 0.3% Malic Acid, 500 ppm SLS, 99.7% NaCl | 11 | 0 | 0 | 4.15 | ND |
| 0.5% Malic Acid, 500 ppm SLS, 99.5% NaCl | 3 | 0 | 0 | 3.39 | ND |
| 0.7% Malic Acid, 500 ppm SLS, 99.3% NaCl | 0 | 0 | 0 | 3.06 | 0.879 |
| 1.0% Citric Acid, 500 ppm SLS, 99.0% NaCl | 0 | 0 | 0 | 2.69 | ND |
| 1.0% Malic Acid, 500 ppm SLS, 99.0% NaCl | 0 | 0 | 0 | 2.81 | ND |
| 2.0% Lactic Acid, 500 ppm SLS, 98.0% NaCl | 0 | 0 | 0 | 2.65 | 0.885 |
| 2.0% Phosphoric Acid (75%), 500 ppm SLS, 98.0% NaCl | 0 | 0 | 0 | 1.52 | 0.884 |
| 1.0% Benzoic Acid, 500 ppm SLS, NaCl | 0 | 0 | 0 | 3.93 | 0.879 |
| 2.0% Citric Acid, 500 ppm SLS, 98.0% NaCl | 0 | 0 | 0 | 2.3 | 0.884 |
| 2.0% Malic Acid, 500 ppm SLS, 98.0% NaCl | 0 | 0 | 0 | 2.46 | 0.882 |

In another experiment, 17% by weight solutions of formulas containing various levels of sodium chloride, citric acid, and sodium lauryl sulfate were tested for effectiveness in killing *L. monocytogenes* at cold temperatures. The same test procedure was used as described above, except test solutions were plated on MOX with a Thin Agar Overlay of TSA (to aid in the recovery of injured cells). Results are given in Table 9. The data indicate that the relative amounts of acid and surfactant can be varied to suit different applications. A shown in table 9, in pH sensitive applications, the acid may be decreased without losing effectiveness. Similarly, in applications where a lower level of surfactant is desired, the performance can be maintained by raising the concentration of acid.

TABLE 9

Effect of Solutions of NaCl, SLS, and Citric Acid on *L. monocytogenes* at −6.7° C.

| Sample | Time 0 CFU/ml | 4 hr CFU/ml | 24 hr CFU/ml | pH |
|---|---|---|---|---|
| 100% NaCl | ~7000 | ~6250 | 2290 | 7.66 |
| 0.3% Citric Acid, 50 ppm SLS, 99.7% NaCl | ~4940 | 163 | 0 | 4.19 |
| 0.3% Citric Acid, 100 ppm SLS, 99.7% NaCl | 2230 | 97 | 0 | 4.27 |
| 0.3% Citric Acid, 150 ppm SLS, 99.7% NaCl | 3080 | 105 | 0 | 4.3 |
| 0.3% Citric Acid, 200 ppm SLS, 99.7% NaCl | 1970 | 42 | 0 | 4.28 |
| 0.3% Citric Acid, 300 ppm SLS, 99.7% NaCl | 1490 | 20 | 0 | 4.3 |
| 0.3% Citric Acid, 400 ppm SLS, 99.7% NaCl | 221 | 1 | 0 | 4.29 |
| 0.3% Citric Acid, 500 ppm SLS, 99.7% NaCl | 99 | 0 | 0 | 4.32 |
| 0.5% Citric Acid, 50 ppm SLS, 99.5% NaCl | 3360 | 0 | 0 | 3.54 |
| 0.5% Citric Acid, 100 ppm SLS, 99.5% NaCl | 3180 | 1 | 0 | 3.54 |
| 0.7% Citric Acid, 50 ppm SLS, 99.3% NaCl | 3710 | 0 | 0 | 3.14 |
| 0.7% Citric Acid, 100 ppm SLS, 99.3% NaCl | 1020 | 0 | 0 | 3.13 |
| 1.0% Citric Acid, 50 ppm SLS, 99.0% NaCl | 1840 | 0 | 0 | 2.82 |
| 1.0% Citric Acid, 100 ppm SLS, 99.0% NaCl | 970 | 0 | 0 | 2.82 |
| 2.0% Citric Acid, 50 ppm SLS, 98.0% NaCl | 114 | 0 | 0 | 2.41 |
| 2.0% Citric Acid, 100 ppm SLS, 96.0% NaCl | 479 | 0 | 0 | 2.41 |
| 4.0% Citric Acid, 50 ppm SLS, 96.0% NaCl | 6 | 0 | 0 | 2.12 |
| 4.0% Citric Acid, 100 ppm SLS, 96.0% NaCl | 1 | 0 | 0 | 2.12 |
| 6.0% Citric Acid, 50 ppm SLS, 94.0% NaCl | 1 | 0 | 0 | 1.99 |

In another experiment, two sets of solutions were tested. The first set (samples 1-12 in Table 10 below) was prepared in hard tap water and contained about 17.0% by mass of the formulation. These samples were inoculated with $10^3$ CFU/ml *L. monocytogenes* by the same procedure as described above. A second set of samples was prepared from brine taken from a ready-to-eat meat processing operation. The recirculated brine had been used to chill packaged meat for one week. After a week of use the brine typically contains various types of aerobic psychrotrophic and mesophilic bacteria. This experiment was done in order to determine if the additives would kill the microorganisms naturally occurring in actual process brine from a plant. Since the spent chill brine samples already contained NaCl citric acid and/or SLS was added to provide an effective concentration of additive. One set of these samples (samples 13-17) were inoculated with $10^3$ *L. monocytogenes* and the other set (samples 18-22) contained only the naturally occurring organisms in the spent chill brine. Results are given in Table 10 below. The data indicate that at lower acid levels, the SLS increases the effectiveness of the mixture, but at higher acid levels, the SLS is not necessary. The results show the formulations are effective in hard water (27 gpg hardness). Other antimicrobials, such as quaternary ammonium compounds can lose significant activity in hard water, often necessitating further additives, such as EDTA as a chelating agent, to maintain antimicrobial activity. The results also demonstrate that the formulations effectively kill *L. monocytogenes* as well as the naturally occurring microorganisms in spent chill brine from an actual meat processing plant.

TABLE 10

Effects of Antimicrobial Salt Formulas in Hard Water and in Spent Chill Brine

| Sample | Time 0 cfu/ml | 2 hr cfu/ml | 24 cfu/ml |
|---|---|---|---|
| 100% NaCl | 760 | 1100 | 1100 |
| 0.3% Citric Acid, 100 ppm SLS, 99.7% NaCl | 730 | 670 | 29 |
| 0.3% Citric Acid, 99.7% NaCl | 1460 | 1330 | 830 |
| 0.5% Citric Acid, 100 ppm SLS, 99.5% NaCl | 890 | 240 | 0 |
| 0.5% Citric Acid, 99.5% NaCl | 1060 | 1170 | 330 |
| 0.7% Citric Acid, 100 ppm SLS, 99.3% NaCl | 1010 | 14 | 0 |
| 0.7% Citric Acid, 99.3% NaCl | 1040 | 1030 | 3 |
| 1.0% Citric Acid, 100 ppm SLS, 99.0% NaCl | 840 | 0 | 0 |
| 1.0% Citric Acid, 99.0% NaCl | 990 | 340 | 0 |
| 2.0% Citric Acid, 98.0% NaCl | 910 | 0 | 0 |
| 4.0% Citric Acid, 96.0% NaCl | 1110 | 0 | 0 |
| 6.0% Citric Acid, 94.0% NaCl | 950 | 0 | 0 |
| Brine Control with *L. mono* | 1260 | 1290 | 600 |
| 1% Citric Acid in Brine with *L. mono* | 1050 | 0 | 0 |
| 2% Citric Acid in Brine with *L. mono* | 1140 | 0 | 0 |
| 1% Citric Acid + 50 ppm SLS in Brine with *L. mono* | 1090 | 0 | 0 |
| 2% Citric Acid + 50 ppm SLS in Brine with *L. mono* | 1070 | 0 | 0 |
| Brine Control | 6000 | 3100 | 2000 |
| 1% Citric Acid in Brine | 2490 | 190 | 4 |
| 2% Citric Acid in Brine | 1670 | 6 | 0 |
| 1% Citric Acid + 50 ppm SLS in Brine | 2520 | 122 | 0 |
| 2% Citric Acid + 50 ppm SLS in Brine | 1480 | 6 | 0 |

A test was run to determine if salts other than sodium chloride would show a synergistic antimicrobial effect with an acid and sodium lauryl sulfate. Solutions containing 0.6409 grams malic acid and 0.0107 grams sodium lauryl sulfate per liter were prepared with and without 107.0 grams of various salts (added on an anhydrous basis). Solutions were inoculated with *E. coli* described above and the amount of bacterial kill was measured to determine if the added salt caused an increase in the effectiveness of the acid/surfactant active ingredients. Results are shown in Table 11.

TABLE 11

Effect of Different Salts on the Antimicrobial Action of Malic Acid/SLS

| Solution (salt added) | % Kill of *E. Coli* |
|---|---|
| No salt addition | 4.4% |
| Sodium sulfate | 87% |
| Magnesium chloride | 56% |
| Potassium chloride | 18% |
| Sodium chloride | 78% |
| Potassium sulfate | 34% |
| Calcium chloride | 55% |
| Magnesium sulfate | 93% |

Tests run on solutions containing only the salt and no other ingredient indicate that sodium sulfate, potassium chloride and potassium sulfate provide no bacterial kill. Magnesium chloride solution provided 61% kill, calcium chloride provided 26% kill, and magnesium sulfate provided 10% kill. Thus, based on the data developed thus far, sodium sulfate, sodium chloride, and magnesium sulfate appear to significantly increase the effectiveness of the acid and/or surfactant antimicrobial agent, even though the salts provide little kill on their own.

The effectiveness of antimicrobial salt formulas was tested against *L. monocytogenes* in a biofilm. Stainless steel coupons (2×5 cm, type 302 stainless steel, 2B finish) were cleaned in acetone followed by an alkaline detergent and distilled water and then dried in an autoclave at 121° C. for 15 minutes. A culture of *L. monocytogenes* (Scott A—serotype 4b) was prepared by inoculating 10 mL of TSA and incubating overnight at 35° C. 50 mL of sterile TSA+0.6% yeast extract (YE) was aseptically dispensed into sterile disposable conical shaped plastic tubes and one drop of overnight grown *L. mono* culture was added to each tube. Inoculated tubes were incubated at 25° C. for approximately 48 hours. After the biofilm had formed on the coupons, a coupon was aseptically removed from the tube and gently rinsed with distilled water to remove unattached cells. Coupons were then immersed in cold antimicrobial test solution (−6.7° C.) and incubated over different time intervals (1 hour, 24 hours, and 5 days). After incubation period, the coupon was shaken in a tube containing 40 mL of sterile PBW and 10 sterile glass beads (4 mm) for 2 minutes two remove the cells attached to the coupon biofilm. The cells were plated in the PBW on TSA+0.6% YE using appropriate dilutions and incubated at 35° C. for 48 hours.

Results on triplicate samples of antimicrobial test solutions are given in Table below. Each solution contained 17% by weight of a formula consisting of the percentages of citric acid and SLS listed in Table 12 with the balance of the formula being NaCl in each case. The data indicate that not only are the antimicrobial salt solutions effective at killing bacteria suspended in solution, they are also effective at killing bacteria within a biofilm.

TABLE 12

Log Concentration of *L. monocytogenes* in Antimicrobial Salt Solutions

| Sample | 1 Hour | 24 Hours | 5 days |
|---|---|---|---|
| 0.3% citric acid, 100 ppm SLS | ~5.08 | 4.59 | 1.38 |
| 0.3% citric acid, 100 ppm SLS | ~4.90 | 3.85 | 1.79 |
| 0.3% citric acid, 100 ppm SLS | ~4.81 | 3.48 | 1.92 |
| 0.3% citric acid, 500 ppm SLS | 4.81 | 4.76 | 2.23 |
| 0.3% citric acid, 500 ppm SLS | 4.90 | 3.48 | 2.18 |
| 0.3% citric acid, 500 ppm SLS | ~5.18 | 3.48 | 2.36 |
| 0.7% citric acid, 100 ppm SLS | 1.88 | 0 | 0 |
| 0.7% citric acid, 100 ppm SLS | 2.02 | 0 | 0 |
| 0.7% citric acid, 100 ppm SLS | 1.28 | 0 | 0 |
| 0.7% citric acid, 500 ppm SLS | 0.70 | 1.00 | 0.90 |
| 0.7% citric acid, 500 ppm SLS | 0.90 | 0.70 | 0.30 |
| 0.7% citric acid, 500 ppm SLS | 0.85 | 0 | 0 |
| 2.0% citric acid, 100 ppm SLS | 0 | 0 | ND |
| 2.0% citric acid, 100 ppm SLS | 0 | 0 | ND |
| 2.0% citric acid, 100 ppm SLS | 0 | 0 | ND |
| 2.0% citric acid, 500 ppm SLS | 0 | 0 | ND |
| 2.0% citric acid, 500 ppm SLS | 0 | 0 | ND |
| 2.0% citric acid, 500 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 500 ppm SLS | 0 | 0 | ND |
| 6.0% citric acid, 500 ppm SLS | 0 | 0 | ND |
| 6.0% citric acid, 500 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 500 ppm SLS | 0 | 0 | ND |
| 12.0% citric acid, 500 ppm SLS | 0 | 0 | ND |
| 12.0% citric acid, 500 ppm SLS | 0 | 0 | ND |
| Salt Control A | ~5.04 | ~7.15 | 7.65 |
| Salt Control B | ~5.48 | ~7.15 | 7.42 |
| Salt Control C | ~5.48 | ~7.11 | 7.65 |
| Water Control | ~5.18 | ~7.18 | 7.54 |

Another set of experiments was done in order to determine the effectiveness of different acids and different types of surfactants in the antimicrobial salt formulations. In one experiment, test solutions containing ~17% by weight of formulas containing various levels of sodium chloride, 100 ppm sodium lauryl sulfate, and various levels of different acids were tested for effectiveness in killing *L. monocytogenes* at cold temperatures. The same test procedure was used as described above (test solutions were plated on MOX TAL (Modified Oxford Medium with a Thin Agar Layer) with TSA). Results are given in Table 13. The controls were a solution of pure NaCl, a solution of a blend of 100 ppm SLS in NaCl, and a solution of a blend of 0.5% citric acid, 100 ppm SLS, and 99.5% NaCl. The subsequent test solutions were a 17% solution of a blend of NaCl and 100 ppm SLS with enough of the listed acid added to provide the same pH (~3.6) as the 0.5% citric acid control.

TABLE 13

Effect of Different Acids on the Antimicrobial Action of NaCl/Acid/SLS

| Sample Solution Composition | Time 0 (CFU/ml) | Time 4 Hours (CFU/ml) |
|---|---|---|
| Salt control | 850 | 1380 |
| Salt + SLS control | 980 | 890 |
| Salt + SLS + citric acid control | 1230 | 18 |
| Salt + SLS + succinic acid | 1070 | 69 |
| Salt + SLS + isoascorbic acid | 1140 | 59 |
| Salt + SLS + adipic acid | 900 | 4 |
| Salt + SLS + sorbic acid | 820 | 500 |
| Salt + SLS + acetic acid | 1070 | 230 |
| Salt + SLS + propionic acid | 1440 | 6 |
| Salt + SLS + lactic acid | 1050 | 220 |
| Salt + SLS + ascorbic acid | 1230 | 54 |
| Salt + SLS + formic acid | 1930 | 38 |
| Salt + SLS + phosphoric acid | 1050 | 17 |
| Salt + SLS + hydrochloric acid | 1100 | 44 |
| Salt + SLS + tartaric acid | 1180 | 410 |
| Salt + SLS + glutaric acid | 610 | 180 |
| Salt + SLS + benzoic acid | 1020 | 17 |
| Salt + SLS + salicylic acid | 1100 | 5 |
| Salt + SLS + sulfuric acid | 830 | 0 |

In another experiment, test solutions containing 17% by weight of formulas containing 99.7% sodium chloride, 0.3% citric acid, and 500 ppm of various types of surfactants were tested for effectiveness in killing *L. monocytogenes* at cold temperatures. The same test procedure was used as described (test solutions were plated on MOX TAL (Modified Oxford Medium with a Thin Agar Layer) with TSA). Results are given in Table 14.

TABLE 14

Effect of Different Acids on the Antimicrobial Action of NaCl/Acid/SLS Surfactant Tested

| Surfactant Tested | Time 0 (CFU/ml) | Time 4 Hours (CFU/ml) |
|---|---|---|
| Salt Control (no additive) | 880 | 610 |
| polyoxyethylene-polyoxypropylene block polymer | 820 | 610 |
| sodium salt of sulfonated oleic acid | 240 | 0 |
| sodium xylene sulfonate | 910 | 820 |
| dodecyl diphenyl oxide disulfonate | 0 | 0 |
| sodium linear alkyl-benzene sulfonate | 490 | 0 |
| alpha-olefin sulfonate | 370 | 0 |
| alkylpolyglucoside | 280 | 0 |
| nonylphenol ethoxylate | 460 | 0 |
| fatty alkanolamide | 470 | 0 |
| alcohol ethoxylate | 1080 | 1 |
| lauramine oxide | 2 | 0 |

One or more embodiments of the present invention can be operated under various sets of conditions. In one, a chilling brine maintained at a temperature of about −1.9° C. is employed. The chilling brine comprises, on a dry basis, between about 0.3% and about 1.0% citric acid. The citric acid concentration may be increased to as high as about 2.0%. Between about 100 and about 500 ppm SLS is utilized. The balance of the brine formulation is NaCl, and the formulation is mixed with water to a solution of about 9% to about 12%. In another chilling brine application, a chilling brine is maintained at a temperature of about −6.7° C. The chilling brine comprises between about 0.3% and about 1.0% citric acid. Again, the citric acid concentration may be increased to as high as about 2.0%. Between about 100 and about 500 ppm SLS is utilized. The balance of the brine formula is NaCl, and the formulation is mixed with water to a solution of about 15% to about 17%.

In accordance with another embodiment of the present invention, tests were conducted to determine the antimicrobial efficacy of a salt formulation containing a surfactant but no added acid. The effect of an aqueous solution comprising about 20 wt. % of various salt and salt/surfactant formulations on *L. monocytogenes* were tested in a manner directly analogous to that set forth above in connection with the data in Table 8. Table 15 sets forth the compositions and the *L. monocytogenes* population (stated as the log of the concentration of the bacteria) found after 4 hours of incubation. [Note that the compositions in Table 15, below, state the concentration in the solution, not in the salt concentrate. Since the solutions are 20 wt. % of the salt formulation, the concentration of surfactant in the salt formulation would be about five times the stated concentration in the solution.]

TABLE 15

Effect of Solutions of NaCl and SLS on *L. monocytogenes*

| Solution Composition | Population at 4 hours (log cfu/mL) |
|---|---|
| Water Control | 4.61 |
| 20% NaCl (control) | 4.32 |
| 50 ppm SLS (no NaCl) | 3.90* |
| 50 ppm SLS, 20% NaCl | 0.85** |

*The 3.90 value is an average of two runs that yielded values of 3.84 and 3.95.
**The 0.85 value is an average of two runs that yielded values of 0.70 and 1.00.

Further tests were run on a variety of different surfactants, demonstrating that a variety of different types of surfactants show a strong synergistic effect in combination with salt: sodium lauryl sulfate, linear alkylbenzene sulfonates, alcohol sulfates, alkyl sulfates, alkyl sulfonates, sodium alkyl methyltaurines, alpha-olefin sulfonates, alcohol ethoxylates, nonylphenyl ethoxylates, alkylpolyglucosides, fatty alcohols, fatty acids and fatty acid salts, lignosulfonates and lignin derivatives, hydroxypoly(oxyethylene) derivatives, fatty alkanolamides, fatty amine oxides, sodium dioctylsulfosuccinate, dodecylbenzene sulfonic acid and salts thereof, the sodium salt of sulfonated oleic acid, sodium dodecylbenzene sulfonate, lauramine oxide, dodecyldiphenyloxide-disulfonic acid and salts thereof.

Further examples of surfactants that may be used in some embodiments of the present invention include alkyl (C8-C24) benzenesulfonic acid and its ammonium, calcium, magnesium, potassium, sodium, and zinc salts; alkyl (C8-C18) sulfate and its ammonium, calcium, isopropylamine, magnesium, potassium, sodium, and zinc salts; diethylene glycol abietate, lauryl alcohol, lignosulfonate and its ammonium, calcium, magnesium, potassium, sodium, and zinc salts;

nonyl, decyl, and undecyl glycoside mixture with a mixture of nonyl, decyl, and undecyl oligosaccharides and related reaction products (primarily decanol and undecanol) produced as an aqueous based liquid (50 to 65% solids) from the reaction of primary alcohols (containing 15 to 20% secondary alcohol isomers) in a ratio of 20% C9, 40% C10, and 40% C11 with carbohydrates (average glucose to alkyl chain ratio 1.3 to 1.8); α-(o,p-dinonylphenyl)-ω-hydroxypoly (oxyethylene) mixture of dihydrogen phosphate and monohydrogen phosphate esters and the corresponding ammonium, calcium, magnesium, monethanolamine, potassium, sodium, and zinc salts of the phosphate esters; the poly(oxyethylene) content averages 4-14 moles; α-(p-nonylphenyl)-ω-hydroxypoly (oxyethylene) mixture of dihydrogen phosphate and monohydrogen phosphate esters and the corresponding ammonium, calcium, magnesium, monethanolamine, potassium, sodium, and zinc salts of the phosphate esters, the poly(oxyethylene) content averages 4-14 moles or 30 moles; α-(p-nonylphenyl)-ω-hydroxypoly(oxyethylene) produced by the condensation of 1 mole nonylphenol with an average of 4-14 moles or 30-90 moles ethylene oxide; α-(p-nonylphenyl)-ω-hydroxypoly(oxyethylene) sulfate, ammonium, calcium, magnesium, potassium, sodium, and zinc salts; octyl and decyl glucosides mixture with a mixture of octyl and decyloligosaccharides and related reaction products (primarily n-decanol) produced as an aqueous based liquid (68-72% solids) from the reactions of straight chain alcohols (C8 (45%), C10 (55%)) with anhydrous glucose; oxidized pine lignin and its salts thereof; β-pinene polymers; polyethylene glycol (α-hydro-ω-hydroxypoly(oxyethylene)); mean molecular weight of 194 to 9500 amu; α-(p-tert-Butylphenyl)-ω-hydroxypoly(oxyethylene) mixture of dihydrogen phosphate and monohydrogen phosphate esters and the corresponding ammonium, calcium, magnesium, monethanolamine, potassium, sodium, and zinc salts of the phosphate esters; the poly(oxyethylene) content averages 4-12 moles; α-(o,p-dinonylphenyl)-w-hydroxypoly (oxyethylene) produced by the condensation of 1 mole of dinonylphenol with an average of 4-14 or 140-160 moles of ethylene oxide; sodium or potassium salts of fatty acids; sodium α-olefinsulfonate (sodium C14-C16) (Olefin sulfonate); sodium diisobutylnaphthalene sulfonate and/or sodium.isopropylisohexylnaphthalene sulfonate; sodium dodecylphenoxybenzenedisulfonate; sodium lauryl glyceryl ether sulfonate; sodium oleyl sulfate; sodium N-lauroyl-N-methyltaurine, sodium N-palmitoyl-N-methyltaurine and/or sodium N-oleoyl-N-methyltaurine; sodium monoalkyl and dialkyl (C8-C16) phenoxybenzenedisulfonate mixtures containing not less than 70% of the monoalkylated products; 2,4,7,9-tetramethyl-5-decyn-4,7-diol; and/or nonylphenol ethoxylates with average moles of ethoxylation between 4 and 30.

Further, in other embodiments the surfactant may be one or more of the following alcohol ethoxylates: α-Alkyl (C9-C18-ω-hydroxypoly(oxyethylene) with polyoxyethylene content of 2-30 moles; α-(p-alkylphenyl)-ω-hydroxypoly(oxyethylene) produced by the condensation of 1 mole of alkylphenol (alkyl is a mixture of propylene tetramer and pentamer isomers and averages C13) with 6 moles ethylene oxide; α-Alkyl (C6-C14-ω-hydroxypoly(oxypropyylene) block copolymer with polyoxyethylene; polyoxypropylene content is 1-3 moles; polyoxyethylene content is 4-12 moles; average molecular weight is approximately 635 amu; α-Alkyl (C12-C15-ω-hydroxypoly(oxypropyylene)poly(oxyethylene) copolymers (where the poly(oxypropylene) content is 3-60 moles and the poly (oxyethylene) content is 5-80 moles; α-(p-Dodecylphenyl)-ω-hydroxypoly(oxyethylene) produced by the condensation of 1 mole of dodecylphenol with an average of 4-14 or 30-70 moles ethylene oxide; ethylene oxide adducts of 2,4,7,9-tetramethyl-5-decynediol, the ethyelene oxide content averages 3.5, 10, or moles; α-Lauryl-ω-hydroxypoly(oxyethylene), sodium salt; the poly(oxyethylene) content is 34 moles; secondary alkyl (C11-C15) poly (oxyethylene) acetate salts; ethylene oxide content averages 5 moles; α-[p-1,1,3,3-tetramethylbutyl)phenyl-]-ω-hydroxypoly(oxyethylene) produced by the condensation of 1 mole of p-1,1,3,3-tetramethylbutylphenol with a range of 1-14 or 30-70 moles ethylene oxide; tridecylpoly(oxyethylene) acetate salts where the ethylene oxide content average, 6-7 moles; poly(oxy-1,2-ethanediyl), α-(carboxymethyl)-ω-(nonylphenoxy) produced by the condensation o 1 mole nonylphenol with an average of 4-14 or 30-90 moles ethylene oxide with a molecular weight in the ranges 454-894 and 1598-4238; and/or α-Stearoyl-ω-hydroxy(polyoxyethylene), polyoxyethylene content averages either 8, 9, or 40 moles.

In yet other embodiments, the surfactant may be selected from the group having the formula: $CH_3(CH_2)_{10}—O(CH_2CH_2O)_yH$, where y=average moles of ethoxylation and is in the range of about 3-9.

Hence, in some embodiments of the invention the formulation may comprise an inorganic salt and surfactant such that when in solution the solution comprises surfactant in a concentration of: at least about 5 ppm, about 5-5000 ppm, about 5-500 ppm, about 10-25000 ppm, about 10-100 ppm, about 10-50 ppm, about 25-500 ppm, or about 500-1500 ppm.

Further, in other embodiments of the present invention, the ratio by weight of salt to surfactant may be greater than 29:1, greater than 1880:1, or greater than 1980:1.

In other embodiments of the current invention, solutions may comprise at least 2% of the dry composition, at least 5% of the dry composition, up to about 26% of the dry composition, between about 5% and 25% of the dry composition, between about 9% and 17% of the dry composition, or between about 12% and 15% of the dry composition.

Thus, the data indicate that embodiments of the present invention including solutions of salt and acid and/or surfactant provide efficient kill of bacteria even at temperatures below the freezing point of water. Salts such as sodium sulfate, sodium chloride, and magnesium sulfate act synergistically with the surfactant and/or acid to enhance the antimicrobial effectiveness. The formulations are shown to be effective in killing pathogenic bacteria such as *L. monocytogenes*. The formulas were shown to be effective both in freshly prepared brines and in actual spent process chill brine from a ready-to-eat meat plant. The levels of acid and/or surfactant may be varied to suit the particular application. In addition to effectively killing bacteria suspended in solutions, the some embodiments of the present invention are also shown to be effective at killing bacteria within a biofilm.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:
1. An antimicrobial solution comprising on a dry basis:
between about 100 ppm and about 1000 ppm surfactant selected from the group consisting of $CH_3(CH_2)_{10}$-0$(CH_2CH_2O)yH$, where y=average moles of ethoxylation and is in the range 3-9; and between about 94% and about 99.9% by weight salt selected from the group consisting of sodium, potassium, magnesium, calcium, iron, ammonium salts of chloride, sulfate, nitrate, phosphate, carbonate, acetate, formate, propionate, hydroxypropionate, and hydroxide.

2. The solution of claim 1 wherein the surfactant and salt in combination comprise at least about 2% by weight of the solution.

3. The solution of claim 1 wherein the surfactant and salt in combination comprise at least about 5% by weight of the solution.

4. A method for food processing comprising:
contacting a food product to be processed with a chilling solution wherein the chilling solution comprises a combination of:
a surfactant selected from the group consisting of $CH_3(CH_2)_{10}$—$O(CH_2CH_2O)yH$, where y=average moles of ethoxylation and is in the range 3-9; and
a salt selected from the group consisting of sodium, potassium, magnesium, calcium, iron, and ammonium salts of chloride, sulfate, nitrate, phosphate, carbonate, acetate, formate, propionate, hydroxypropionate, and hydroxide,
wherein the salt and surfactant are on a dry basis between about 25 ppm and about 100,000 ppm by weight surfactant and between about 94% and about 99.9% by weight salt.

5. The method of claim 4 wherein the ratio of the salt to the surfactant of the chilling solution is greater than about 29:1 by weight.

6. The method of claim 4, wherein the chilling solution is maintained at a temperature of less than about 0° C.

7. The method of claim 4, wherein the chilling solution is maintained at a temperature of less than about −6.7° C.

8. The method of claim 4 wherein the surfactant and salt in combination comprise at least about 2% by weight of the chilling solution.

9. The method of claim 4 wherein the surfactant and salt in combination comprise at least about 5% by weight of the chilling solution.

* * * * *

UNITED STATES PATENT AND TRADEMARK OFFICE
CERTIFICATE OF CORRECTION

PATENT NO. : 8,486,472 B2
APPLICATION NO. : 12/087560
DATED : July 16, 2013
INVENTOR(S) : Robert Scott Koefod et al.

It is certified that error appears in the above-identified patent and that said Letters Patent is hereby corrected as shown below:

In the Specification

In column 4, line 39, delete "+/-20°C." and insert -- +/-2°C. --, therefor.

Signed and Sealed this
Twenty-fourth Day of September, 2013

Teresa Stanek Rea
*Deputy Director of the United States Patent and Trademark Office*